US006316773B1

(12) United States Patent
Giakos

(10) Patent No.: US 6,316,773 B1
(45) Date of Patent: Nov. 13, 2001

(54) MULTI-DENSITY AND MULTI-ATOMIC NUMBER DETECTOR MEDIA WITH GAS ELECTRON MULTIPLIER FOR IMAGING APPLICATIONS

(75) Inventor: George C. Giakos, Fairlawn, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 09/317,010

(22) Filed: May 24, 1999

Related U.S. Application Data

(63) Continuation-in-part of application No. 09/078,991, filed on May 14, 1998, now Pat. No. 6,069,362.

(51) Int. Cl.[7] ................................................ G01N 23/04
(52) U.S. Cl. ................ 250/394; 250/385.1; 250/370.01
(58) Field of Search ................................ 250/394, 385.1, 250/370.01

(56) References Cited

U.S. PATENT DOCUMENTS

| | | | |
|---|---|---|---|
| 4,267,446 | * 5/1981 | Brown et al. | 250/394 |
| 4,707,608 | 11/1987 | DiBianca . | |
| 4,780,897 | * 10/1988 | McDaniel et al. | 250/385.1 |
| 5,451,793 | 9/1995 | Boone . | |
| 5,500,534 | 3/1996 | Robinson et al. . | |
| 5,677,539 | * 10/1997 | Apotovsky et al. | 250/370.01 |
| 6,069,362 | * 5/2000 | Giakos | 250/394 |

FOREIGN PATENT DOCUMENTS

| | | |
|---|---|---|
| 405121036 A | 5/1993 | (JP) . |
| WO 97/29507 | 8/1997 | (WO) . |
| WO 99/59001 | 11/1999 | (WO) . |

OTHER PUBLICATIONS

R. Bouclier, et al., New Observations With The Gas Electron Multiplier (GEM) Nuclear Instruments and Methods in Physics Research, Sec. A 396, pp. 50–66 (1997).
J. Benlloch et al. Development of the Gas Electron Multiplier (GEM) *IEEE Transactions On Nuclear Science*, vol. 45, No. 3, Jun. 1998.
C.L. Lingren et al. Cadmium–Zinc–Telluride, MultipleElectrode Detectors Achieve Good Energy Resolution with High Sensitivity at Room–Temperature *IEEE Transactions On Nuclear Science*, vol. 45, No. 3 Jun. 1998.

* cited by examiner

*Primary Examiner*—Constantine Hannaher
*Assistant Examiner*—Andrew Israel
(74) *Attorney, Agent, or Firm*—Renner, Kenner, Greive, Bobak, Taylor & Weber

(57) ABSTRACT

A multi-detector system receives incident radiation through a subject includes a gaseous microstrip detector, which has alternating anodes and cathodes on a substrate opposite a voltage source, is positioned adjacent a semiconductor detector. In a dual energy environment, electric fields are applied to both detectors as the incident radiation is directed therethrough. A gas electron multiplier is placed within the gas microstrip detector, and a potential is applied thereto to improve the generated signal. To further improve this signal, the anode and cathode may be operated as a Frisch Grid. Accordingly, the detectors generate corresponding signals which are compared to generate a contrasted signal of the subject. These signals may be generated for imaging, radiation monitoring, radiation measuring and the like. The direction of incident radiation and the orientation of the electric fields may be adjusted according to the particular application.

23 Claims, 4 Drawing Sheets

MULTI-DENSITY AND MULTI-ATOMIC NUMBER DETECTOR MEDIA WITH GAS ELECTRON MULTIPLIER FOR IMAGING APPLICATIONS

RELATED APPLICATIONS

This application is a continuation-in-part of application Ser. No. 09/078,991 filed May 14, 1998 now U.S. Pat. No. 6,069,362.

TECHNICAL FIELD

The present invention is directed to x-ray digital radiography, including dual-energy imaging, computed tomography (CT), microtomography and x-ray microscopy; nuclear medicine, including quantitative autoradiography, single photon emission tomography (SPECT) and positron emission tomography (PET); any medical detector technology involving monitoring, measuring, recording or projection of ionizing radiation of any energy range; bio-optical imaging, including optical confocal microscopy and optical tomography; and industrial applications, such as aerospace imaging, security surveillance systems, and non-destructive imaging. The invention is more particularly directed to multi-density and multi-atomic number detector media implemented, if needed, by kinestasis or time-delay integration for use in the above applications.

BACKGROUND ART

The capture and detection of ionizing radiation in an efficient way, without significant loss or degradation of the image information, is of paramount significance in medical imaging. Recent advances in medical detector technology make it possible for superior images to be produced by digital electronic techniques, such as digital radiography, as opposed to classical film-screen techniques. In fact, new methods of radiographic imaging that utilize advances in electronics and computer technology have been shown to improve diagnostic quality and allow for new diagnostic modalities with reduced patient dose. Specifically, digital radiography has many advantages over conventional radiography such as expanded display of detector dynamic range, fast image acquisition and display, convenient storage, transmission and display of stored images without degradation, extended capabilities of data analysis and image processing, and reduced patient dose.

Different detector technologies and beam geometries have been proposed for digital radiography, such as scintillator-photodiode systems, high-pressure gas filled detectors, scintillator-photomultiplier systems, kinestatic charge detectors, proximity image intensifier/CCD devices, phosphor screen-photodiode systems and diode arrays.

Some of the disadvantages of known digital radiographic systems are the relatively high initial cost and the limited detector resolution. The efficient detection of X-ray radiation is the main problem in digital radiography, computed tomography, and affiliated disciplines. Recent advances in medical detector technology suggest that superior radiation images may be produced by means of digital electronic techniques. In particular, recent advances in electronics and computer technology have provided improved diagnostic quality and diagnostic modalities while reducing doses of incident radiation. Though several new detectors have been proposed for digital radiography and computed tomography, there is still no single technology of choice that addresses all of the issues for optimal imaging. The technology of choice depends upon several image quality criteria such as high quantum and energy absorption efficiency, high detector quantum efficiency (DQE), high spatial resolution, negligible scattered acceptance, detector geometry, fast readout, high dynamic range, image correction and display capabilities, and of course, acceptable cost. One of the primary problems with digital radiography is the detection of scattered radiation which reduces the contrast of the image. Known line scanning techniques inefficiently utilize the X-ray tube output. This limitation can be overcome by utilizing a wider slot-shaped X-ray beam and collection of multiple lines simultaneously.

One approach to overcome the aforementioned disadvantages is discussed in the patent application U.S. Ser. No. 60/011,499, which is incorporated herein by reference. The approach disclosed therein provides a dual-energy gas microstrip wherein low energy and high energy images are obtained and are compared to provide a high contrast image. Although this approach is effective, it only employs a single medium, the gas surrounding the microstrip, to develop the dual image. Through further research, new devices have been developed which further improve these detection techniques. These devices are described in U.S. patent application Ser. No. 09/078,991 incorporated herein by reference. While this invention provides good spatial and contrast resolution with low dose, the image quality and image contrast could be improved.

In particular, ion and electron interaction within the detector creates random ion/electron motion within the detector element. This motion is detected along with the primary ion/electron flow created by the target. Since the motion is random, it does not completely occlude the image, but reduces the image quality by creating ghost images, cloudiness, or reduced contrast, collectively referred to as noise. Therefore, a need exists for a detector that provides an improved image by reducing the detection of random ion/electron motion. An additional need exists for a detector that amplifies the primary ion/electron flow improving image signal, improving the signal to noise ratio, and generating better contrast between the images.

DISCLOSURE OF INVENTION

In light of the foregoing, it is a first aspect of the present invention to provide a multi-density and multi-atomic number detector media for applications such as, but not limited to, imaging, dosimetry, and radiation monitoring and combinations thereof.

Another aspect of the present invention is to provide an ionization device or source to project ionizing radiation (X-rays, gamma rays, fast particles, neutrons) of any energy range for any application through an object whereupon the rays are received by a multi-detector.

A further aspect of the present invention, as set forth above, is to provide the multi-detector in a dual energy configuration, wherein the dual energy detector receives a bimodal energy spectrum analyzed by two different physical media. In either case, the energy can be polychromatic or monochromatic. In the case of a polychromatic energy spectrum, the single energy term is used as equivalent to "average" or "effective energy" of the polychromatic spectrum.

Yet another aspect of the present invention, as set forth above, is to provide the multi-detector with a low energy detector adjacent to a high energy detector.

Still another aspect of the present invention, as set forth above, is to apply separate electric fields to both low and high energy detectors as the incident radiation is projected therethrough, wherein the low energy detector may either be a gas ionization detector or a semiconductor ionization detector and the high energy detector is the other.

A further aspect of the present invention, as set forth above, is to generate images from the two detectors which are then received by a microprocessor to generate a subtracted image signal for display of the object.

Yet another aspect of the present invention, as set forth above, is to interpose a high pass energy filter needed between the two detectors to assist in developing the contrasted image signal, wherein a low contrast is obtained through weighted subtraction of the two images, such as for soft tissue.

Yet a further aspect of the present invention, as set forth above, is to provide a mechanism for moving the multi-detector as it receives the ionizing radiation and wherein the electric field applied is adjusted to allow for implementation of kinestatic, or time delay integration techniques, or both.

An additional aspect of the present invention, as set forth above, is to provide a multi-detector wherein the gas ionization detector includes a high voltage plate opposite a substrate with a plurality of interleaved anodes and cathodes and wherein a semiconductor ionization detector includes a bias electrode on one side of a semiconductor substrate opposite a plurality of collection electrodes.

Yet another aspect of the present invention, as set forth above, is to provide a multi-detector within two different physical media which the incident radiation is first absorbed by a low energy detector low density, low Z material, with its applied electric field orthogonal to the incident radiation, and wherein the low energy detector is adjacent a high energy detector high density, high Z material, with its applied electric field orthogonal to the incident radiation.

Yet an additional aspect of the present invention, as set forth above, is to provide a multi-detector in which the incident radiation is first absorbed by a low energy detector with its applied electric field facing directly into the incident radiation, and wherein a high energy detector is adjacent the low energy detector with its applied electric field orthogonal to the incident radiation.

Still an additional aspect of the present invention, as set forth above, is to provide a multi-detector in which the incident radiation is first absorbed by a low energy detector with its applied electric field orthogonal to the incident radiation and whereupon the incident radiation is received by a high energy detector with its applied electric field aligned in the same direction as the incident radiation or in other words a high energy detector operating in a slot-scan geometry.

Still another aspect of the present invention, as set forth above, is to configure generate images, and perform related detector functions.

Still yet another aspect of the present invention, as set forth above, is to configure the adjacent detectors to perform the same or different functions noted above. For example, both detectors could perform imaging functions or, alternatively, one adjacent detector could perform an imaging function as the other adjacent detector performs a radiation monitoring function.

Still a further aspect of the present invention, as set forth above, is that the ionizing radiation may be presented in several particles or different radiations (mixed fields), at different energies which can be measured, monitored or displayed by either one or both of the adjacent detectors upon proper optimization of the system geometries, wherein the detectors perform the same or different functions.

Another aspect of the present invention, as set forth above, is to operate at least one of the detectors as a Frisch Grid to increase signal to noise ratio and improve the line spread function.

Yet another aspect of the present invention, as set forth above, is to interpose a gas electron multiplier close to the collector circuit producing electron amplification, without induced current; increasing signal to noise ratio; and improving line spread function.

Still another aspect of the present invention, as set forth above, is to place a gas electron multiplier within the detector volume to improve ion production.

In general, the present invention provides a dual-energy multi-detector which receives incident ionizing radiation through a subject, comprising a gaseous microstrip detector and a semiconductor detector adjacent the gaseous microstrip detector, wherein electric fields are applied to both the detectors as the incident radiation is directed therethrough, the gaseous microstrip detector and the semiconductor detector generating corresponding signals for observation.

The present invention also provides a method for obtaining an image of a subject exposed to incident radiation comprising the steps of exposing a multi-detector to incident radiation projected through a sample, wherein the multi-detector comprises a first detector adjacent a second detector, generating a first signal from the first detector, generating a second signal from the second detector, and comparing the first and second signals.

BRIEF DESCRIPTION OF THE DRAWINGS

For a complete understanding of the objects, techniques, and structure of the invention, reference should be made to the following detailed description and accompanying drawings wherein.

BEST MODE FOR CARRYING OUT THE INVENTION

Figure 1:
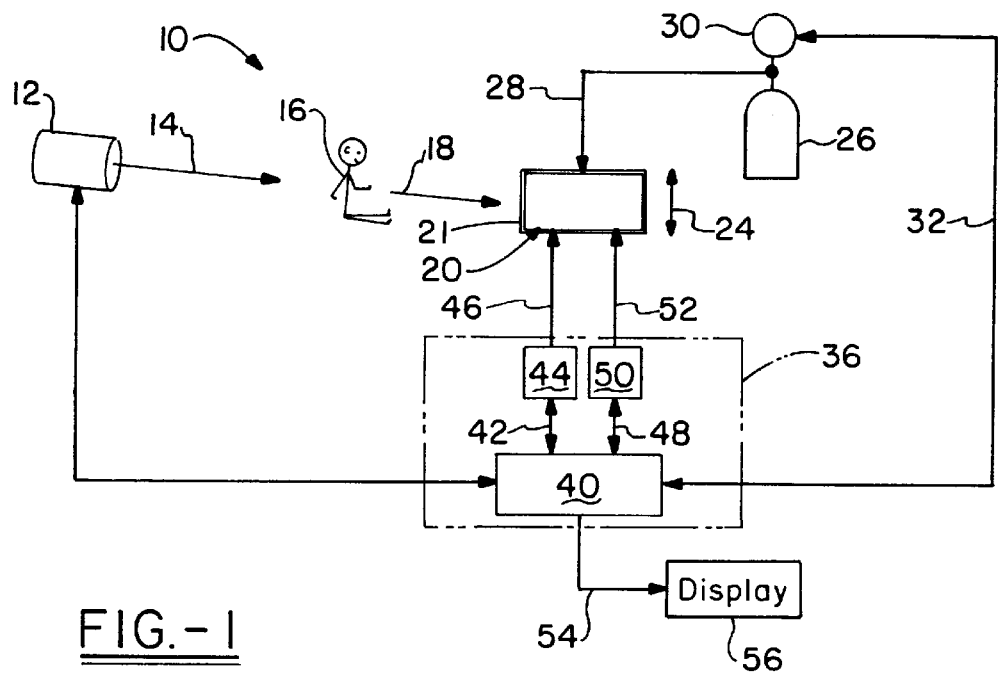
FIG. 1 is a schematic diagram of a multi-density and multi-atomic number detector imaging system.

Referring now to the drawings and more particularly to FIG. 1, it can be seen that a multi-density and multi-atomic number detector imaging system is designated generally by the numeral 10. As will be appreciated by the discussion that follows, the imaging system 10 utilizes a high atomic number or high Z material, which is a high density media, in combination with a low atomic number or low Z material, which is a low density media, in order to provide a high contrast or dual-energy imaging system. The system 10 may operate as a slot-scanning beam detector which may be implemented by kinestasis or time delay integration techniques. Alternatively, the imaging system 10 may be used with an Application Specific Integrated Circuit (ASIC) to be operated as a charged couple device camera. Those skilled in the art will appreciate that the imaging system may be used in large field view imaging, or micro-imaging (microscopy) with dual-energy.

The system 10 includes an ionization device or source 12 for generating and directing ionizing radiation 14 through a subject 16. The ionizing radiation may include, but is not limited to, X-rays, gamma rays, fast particles, neutrons, and the like. The radiation may be projected in the form of mixed fields or at different energies and observed by the multi-detector which performs its predetermined functions. It will be appreciated that the ionization device 12 may be configured to generate a polychromatic energy spectrum of mean energy E or a single energy beam generated by a one frequency spectrum synchrotron. Alternatively, the ionization device 12 may be configured to generate a polychromatic bimodal energy spectrum. The subject 16 may be a person or a biological or pharmaceutical sample through which the radiation passes to generate rays 18 that are received by a multi-density/multi-atomic number multi-detector 20. Typically, the multi-detector 20 is provided in a scaled aluminum enclosure 21 which is movable in a plane orthogonal to the incident image rays 18 in a scanning direction 24. In order to properly obtain an observation of the subject 16, the multi-detector 20 has several components which are connected to the multi-detector 20. As will be appreciated, the "observation" performed by the multi-detector 20 may be for imaging, to monitor radiation, record dosage levels, or perform any known function performed by known ionization detectors. In other words, each detector within the multi-detector 20 may perform different functions or the same function depending upon the desired results and system configuration.

A pressurized gas 26, which may be argon, xenon, krypton, and mixtures thereof, or other noble gases or their mixtures in combination with polar or quenching compounds in a dopant concentration is in fluid communication with the enclosure 21 via a pressure line 28. A pressure meter 30 is attached to the pressurized gas so that the pressure within the enclosure of the multi-detector 20 may be regulated. A pressure signal 32 is generated by the pressure meter 30.

A control system 30 communicates with various components of the system 10 to monitor and control each function thereof In particular, control system 30 includes a microprocessor 40 which provides the necessary software, hardware, and memory to control operation of the imaging system 10. The processor 40 receives the pressure signal line 32 so that pressure within the multi-detector 20 may be adjusted between low, atmospheric and high pressures depending upon the imaging application.

The processor 40 is connected via a signal line 42 to a detector circuit 44 which is connected to the multi-detector 20 via a signal line 46. Likewise, a signal line 48 connects the processor 40 to a detector circuit 50 which is connected via a signal line 52 to the multi-detector 20. The processor 40 receives information from the detector circuit 44 and the detector circuit 50 and generates a contrasted image signal 54 which is received for display by an image display 56. In all of the embodiments to follow where dual-energy imaging is anticipated, the incident radiation is always first received by the low energy detector. Any radiation that is not absorbed is then received by the high energy detector.

Generally, the multi-detector 20 has two basic components: a gas filled detector volume and a solid state or semiconductor substrate detector volume. The incident rays 18 dissipate part of their energy in the first detector volume and then dissipate their remaining energy through interaction in the second detector volume producing, in both cases, charge pairs. An applied electric field through both volumes imparts a constant drift velocity to these charge pairs and drives the charges of polarities toward their respective signal collectors. It will be appreciated that the different detector media used in the detectors may be a solid state semiconductor material, a gas, or a liquid that produces signals via direct or indirect ionization, such as by scintillation, in any geometry, or combination thereof.

For a dual energy multi-detector, logarithmic extractions may be applied to the signals generated by each media whereupon the difference between the two signals generates the desired image. Additional imaging scenarios may be obtained by changing the orientations of the electric field applied to the low and high energy detectors so as to achieve the desired image contrast and spatial resolution, or other functional result.

Figure 2:
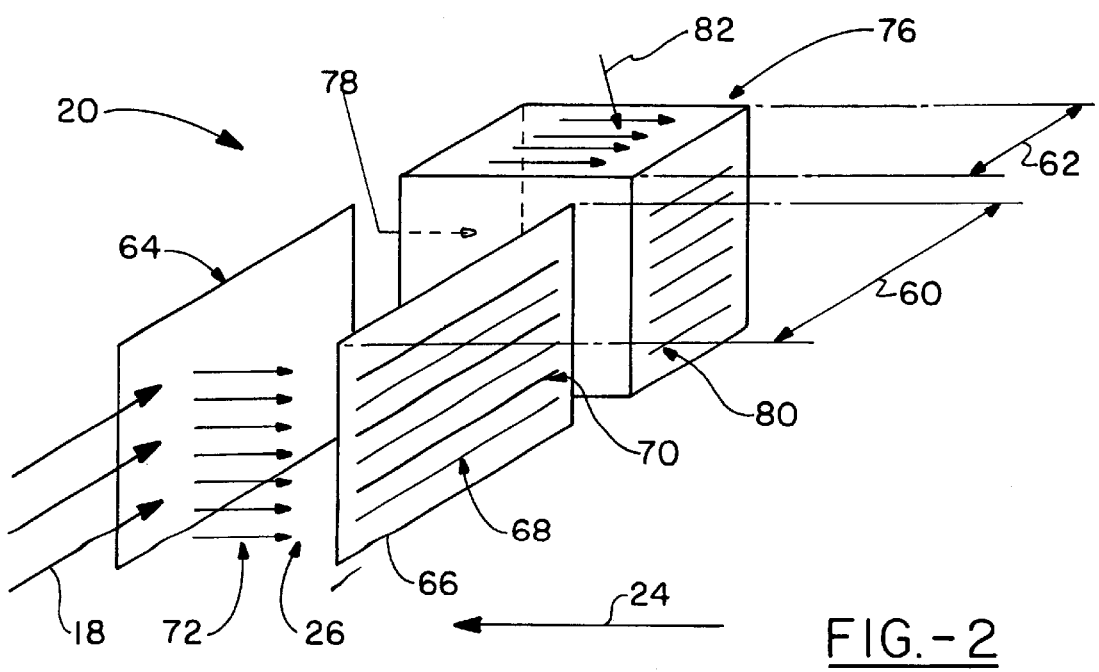
FIG. 2 is a schematic diagram of a preferred detector employed in the imaging system.

Referring now to FIG. 2, one preferred embodiment of the multi-detector 20 is presented. In particular, the multi-detector 20 includes a gas ionization detector 60 and a semiconductor ionization detector 62 for a dual-energy imaging embodiment.

The gas ionization detector 60 includes a high voltage plate 64 opposite a substrate 66. The substrate 66 may be a conductive glass or plastic substrate with suitable electrical conduction properties. The substrate 66 may be provided with an electrically conductive layer on the surface of an insulator by means of ion implantation or deposition of a thin film of semiconductor material. A plurality of insulated microstrip anodes 68 are interleaved with a like plurality of insulated microstrip cathodes 50. Accordingly, an electric field 52 is generated between the high voltage plate 64 and the substrate 66. The high voltage plate 64, the substrate 66, the anodes 68 and the cathodes 50 are connected to the energy detection circuit 44 via the signal line 46.

The semiconductor ionization detector 62 includes a substantially rectangular slab-shaped semiconductor material 56 with a bias electrode 58 disposed on one surface of the cube while a plurality of collection electrodes 80 are disposed on an opposing surface. Accordingly, an electric field 82 is generated between the bias electrode 58 and the collection electrodes 82. Both the bias electrode 58 and the collection electrodes 80 are connected to the detection circuit 50 via a signal line 52.

In all embodiments of the present invention, the detection components of the energy detectors, such as the anodes 68, the cathodes 50, the collection electrodes 80, and even the low and high energy detection circuits 44 and 50 may be incorporated on an integrated circuit contained within the enclosure 21. The integrated circuit would provide all the integrated active and passive signal conditioning and related circuits to generate a digital output received by the processor 40.

In FIG. 2, the detector 60 employs a high-pressure gas environment to provide the advantage of a high primary quantum-detection efficiency together with an efficient conversion into charge carriers. As the gas pressure is increased, the amount of incident photons which interact with the gas increases, therefore increasing the quantum efficiency. Additionally, the amount of photon energy deposited in the gas per interacting photon increases. At high pressures, a large number of electrons and fluorescence is stopped in the gas and thus, the sensitivity is determined by the energy carried by the resulting gamma photons. Therefore, a high pressure gas-filled ionization detector, operating in a saturation regime, offers many advantages.

In the preferred embodiment, it appears that the gas of choice is xenon because of its high X-ray stopping power. However, krypton may provide an advantage since it has less emitted and re-absorbed fluorescence and allows the interactions to spread out from where the incident radiation impinges on the enclosure 21 while restricting the ranges of the emitted photo electrons and Compton electrons, thereby improving spatial resolution.

The response of a high-pressure gas-filled detector 60 may be greatly improved by moving the enclosure 21 in synchrony with the ions wherein the ion speed is adjusted, by adjusting the applied electric field, so that the ion speed is equal and opposite to the scan speed 24 of the multi-detector 20. Thus, at any instant in time, 50–100 lines of image data are integrated simultaneously, depending upon the scan speed and sampling rate. However, only one line of collector electrodes is needed to read out the fully-integrated image data.

An improvement of the multi-detector 20 and imaging parameters are obtained by utilizing the microstrip substrate 66 as a collector. Thus, by applying the anodes 68 and cathodes 50 with photolithographic techniques, high gain uniformity over large areas is attainable. Accordingly, as the incident radiation is directed through the multi-detector 20, the primary electrons produced by direct gamma-ray ionization of the gas medium are directed toward the anodes 68. When the electrons reach the electric field between the anodes and cathodes 68 and 50, the electrons drift toward the cathodes 50 and experience an avalanche amplification at sufficiently high field strength, due to the quasi-dipole anode-cathode configuration.

In the present embodiment, the multi-detector 20 utilizing a high operating gas pressure has been chosen as a compromise between high quantum detective efficiency and reduced electron range, and adequate gain. Advantages of the gas-microstrip substrate for the detector 60 include high spatial and contrast resolution, resulting from the fine collector size, high gas pressure, and high gain. Further advantages of utilizing the low energy detector in the present invention are that a high gain is achieved with a low applied voltage, due to the high local electric fields generated near the anodes. A further advantage is that large signals are produced due to the high gain and high quantum efficiency. Yet another advantage is that an extremely small signal collection time is needed due to the small anode cathode separation, high drift velocity caused by the high electric fields, and a small value of microstrip capacitance which thereby eliminates space-charge effects. Still another advantage is that a high mechanical stability low cost detector is provided.

In FIG. 2, the detector 62 receives the image rays 18 which are not affected by the detector 60 and are impinged upon the semi-conductor material 56. Accordingly, the detector 62 is optimally used for digital radiography because of the direct conversion of x-rays to electrical signals. For example, $Cd_{1-x}Zn_xTe$ is one potential semiconductor material for medical and industrial imaging applications because it has a high stopping power due to its high mass of density (5.8 g/cm$_3$) and an effective atomic number Z of 49.6 ($Cd_{0.9}$:48, $Zn_{0.1}$:30, Te:52). This allows for a decreased detector thickness and consequently, good spatial resolution. Other potential semi-conductor materials are a-Se, a-Si, CdTe and the like which provide a high atomic number and high density. The primary advantages of such a semiconductor ionization detector, as embodied in the multi-detector 20, is evident by its efficient radiation absorption, good linearity, high stability, high sensitivity and wide dynamic range. Significant progress has been achieved in the growth of high quality $Cd_{1-x}Zn_xTe$ semiconductor crystals using a High Pressure Bridgman technique. Specifically, by alloying CdTe with Zn, the bulk resistivity of this semiconductor is approximately $10^{11}$ Ω-cm. This high resistivity is due to the wide band gap of the ternary semiconductor which results in low leakage currents and consequently, low noise characteristics. The imaging potential of the solid state detector can be improved if a time-delay integration technique is utilized. In this technique, the semiconductor material is organized into an array of pixels consisting of N columns and M rows. The speed with which the collective charge is transferred along the columns is synchronized with the speed with which the detector is scanned or translated parallel to the image plane. As a result, the collected charge, corresponding to one portion of the observed subject, is integrated during image acquisition providing a larger signal than that collected in any individual pixel.

Once the rays 18 have passed through the detector 60 and the detector 62, corresponding signals 46 and 52 are generated and received by the detection circuit 44 and the detection circuit 50, respectively. Each circuit 44 and 50 controls application of the respective electric fields and monitors the collected signals and if required, performs signal filtering and processing as known in the art. For example, the high voltage plate 64 and the substrate 66 are connected to the circuit 44 to control application of the electric field 52, while the anodes 68 and the cathodes 50 are connected to the circuit 44 to monitor the low energy absorption of the ionized gas medium. Likewise, the bias electrode 58 and the collection electrodes 80 are connected to the circuit 50 to control application of the electric filed 82 and to monitor the energy absorption of the semiconductor substrate. The circuits 44 and 50 then pass corresponding signals 42 and 48 to processor 40, which in turn generates the contrasted signal 54.

In the alternative embodiments to follow, the positioning of the multi-media detectors may be interchanged along with the orientation of their respective electric fields. In any event, the gas ionization detector is always associated with detection circuit 44 and the semiconductor ionization detector is always associated with detection circuit 50.

Figure 3:
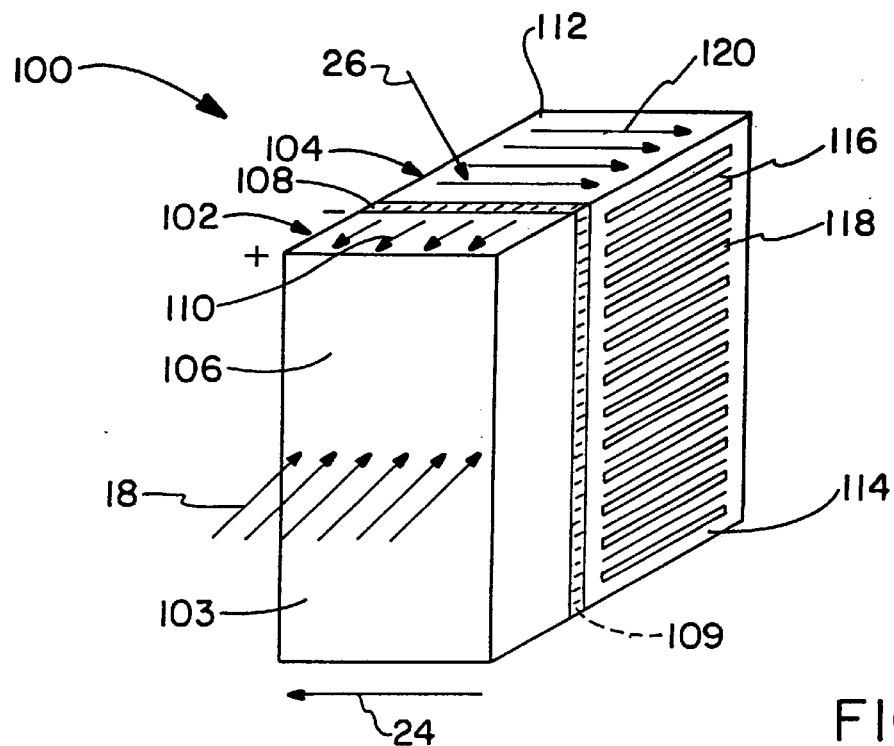
FIG. 3 is a first alternative embodiment of a detector employed in the imaging system.

Referring now to FIG. 3, it can be seen that an alternative multi-detector is generally designated by the numeral 100. The multi-detector 100, which is received in the enclosure 21, provides a first or low energy detector 102 adjacent a second or high energy detector 104. In this embodiment, the rays 18 are first impinged upon the detector 102 which employs a semiconductor substrate 103. The detector 102 provides a bias electrode 106 on one side of the substrate 103 which directly faces the rays 18 while the opposite side of the substrate 103 provides a pixel array detector 108 made up of a plurality of pixels 109. Accordingly, an electric field 110 is generated across the substrate 103 and is oriented in a direction opposite the rays 18. In a dual energy embodiment, the low energy of the rays 18 are first absorbed in the substrate 103 and any energy that is not absorbed thereby is directed to the detector 104. The detector 104 includes a high voltage plate 112 opposite a substrate 114. As in the prior embodiment, a plurality of microstrip anodes 116 are interleaved with a plurality of microstrip cathodes 118. Accordingly, an electric field 120 is orthogonal to the rays 18 and opposite the scan direction 24. The images generated by the detector 102 and the detector 104 are then transferred to their corresponding circuits 44 and 50 for processing by the processor 40 which in turn generates a contrasted image signal 54. As in the previous embodiment, the electrical leads and components associated with the detectors 104 and 102 are connected to their respective detection circuits which are in turn connected to the processor 40.

Figure 4:
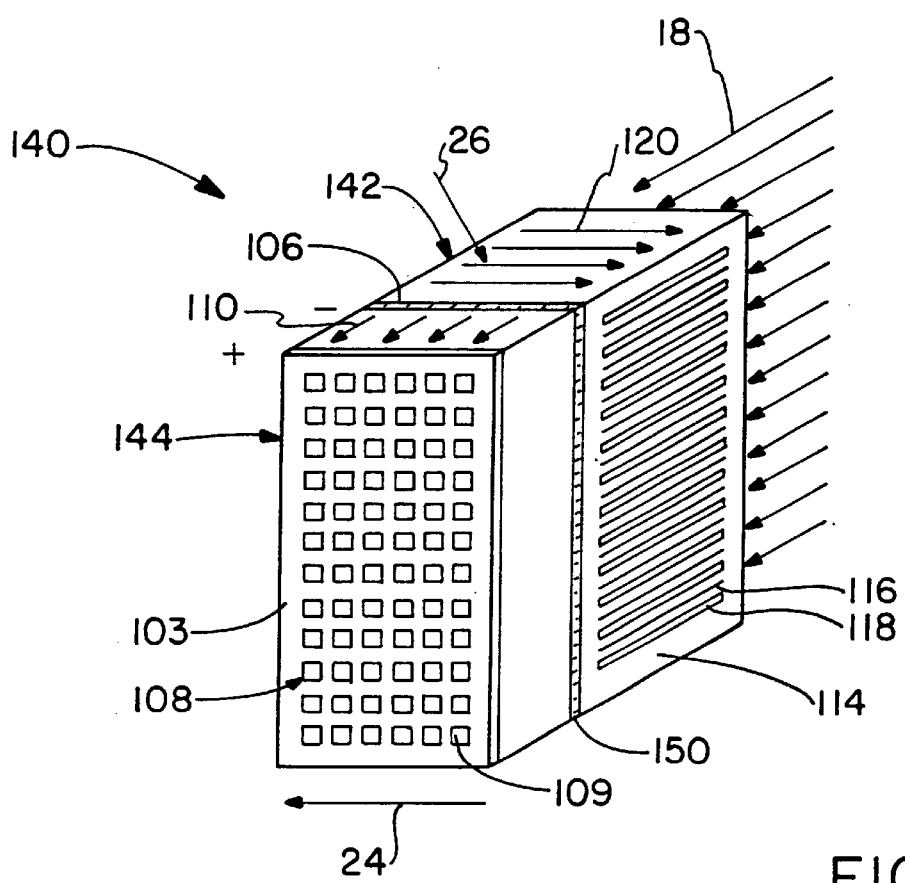
FIG. 4 is a second alternative embodiment of a detector employed in the imaging system.

In an alternative embodiment, as presented in FIG. 4, an alternative multi-detector is generally designated by the numeral 140. In this embodiment, the rays 18 first impinge upon a gas ionization detector 142 with its electric field is orthogonal thereto. Next, the rays 18 are received by a semiconductor ionization detector 144 adjacent to the detector 142. In this variation, however, the bias electrode 106 is adjacent the detector 142 with the pixel array detector 108 being opposed thereby. Otherwise, all the structural features of this embodiment are the same as that of the detector of the previous embodiment. Therefore, the electric field 110 is oriented in the same direction as the impinging rays, the signals are then collected and generated as in the previous embodiments.

If desired, both of the multi-detectors 100 and 140 may be provided with a high pass energy filter 150 disposed between the detectors.

Figure 5:
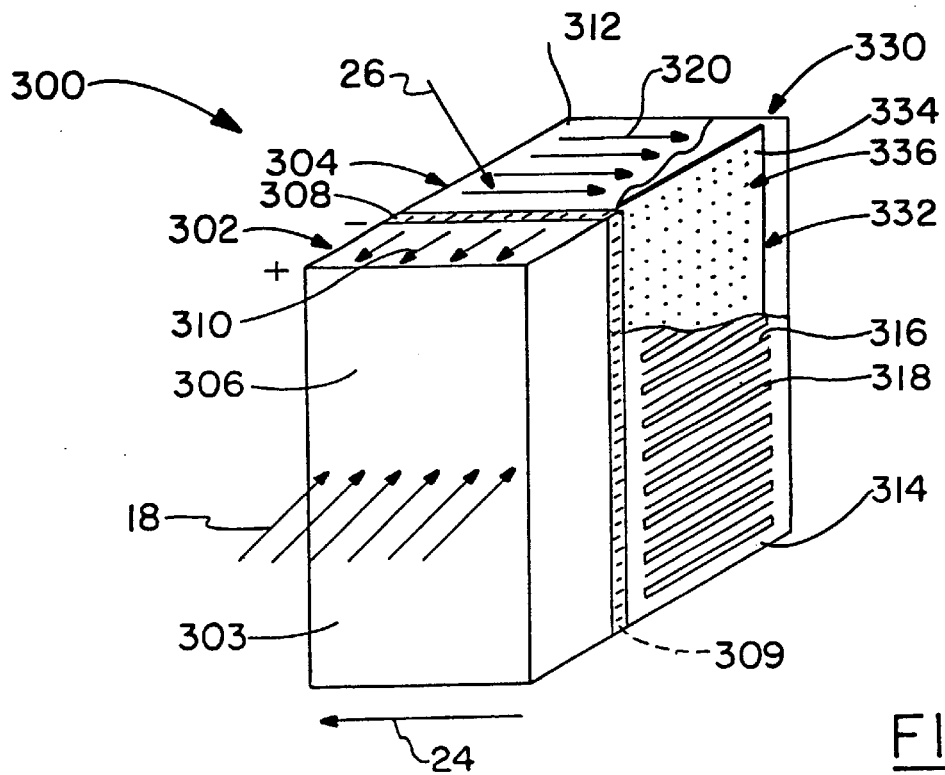
FIG. 5 is a partially cutaway schematic diagram of an alternative embodiment employed in imaging.

Referring now to FIG. 5, it can be seen that an alternative multi-detector is generally designated by the numeral 300. The multi-detector 300, provides a first or low energy detector 302, which is a gas ionization detector, adjacent a second or high energy detector 304 in the form of a semiconductor ionization detector. In this embodiment, the rays 18 are first impinged upon detector 302 which employs a semiconductor substrate 303. The detector 302 provides a bias electrode 306 on one side of the substrate 303 which directly faces the rays 18 while the opposite side of the substrate 303 provides a pixel array detector 308 made up of a plurality of pixels 309. Accordingly, an electric field 310 is generated across the substrate 303 and is oriented in a direction opposite the rays 18. In a dual energy embodiment, the low energy of the rays 18 is first absorbed in the substrate 303 and any energy that is not absorbed thereby is directed to the detector 304.

The detector 304 includes a high voltage plate 312 opposite a substrate 314. As in the other embodiments, the substrate 314 provides a plurality of microstrip anodes 316 interleaved with a plurality of microstrip cathodes 318 which forms a collector circuit. An added feature of this embodiment, is the inclusion of gas electron multiplier 330 placed close to the collector circuit, anode and cathode strips. As best shown in the cutaway portion of FIG. 5, the gas electron multiplier (GEM) 330 is preferably placed within the detector volume and positioned a few millimeters from the collector circuit. Gas electron multiplier 330 comprises a thin composite mesh acting as a gas proportional amplifier in gas media. Preferably, GEM 330 is constricted of an insulating foil 332 metal clad on both sides 334 and perforated by a regular matrix of holes 336. The holes' size, preferably, is in the micron range. The perforated foil inhibits scattered electron motion, and provides a path for those electrons flowing within the produced field.

An electric field 320 is orthogonal to the rays 18 and opposite the scan direction 24. Electrons within the electron field 320 come into contact with the gas electron multiplier 330 and seeks passage through the matrix of holes 336. The electrons collide with gas particles inside the holes 336 causing increased electron activity. This increased activity is seen as an increased electric field produced at the anode 316 of the adjacent. The increased electric field strengthens the produced signal.

In an alternative embodiment, signal quality is further improved by applying a potential difference between the GEM's two sides 334, an electron amplification takes place through a dipole field developed between the hole edges. Avalanching takes place and an increased electric field is produced at the anode. In each embodiment, the increased electric field improves the signal to noise ratio by producing an amplified signal. Any kind of anode collector or geometry can be used, such as printed circuit board, pixelated, or stripped.

Figure 7:
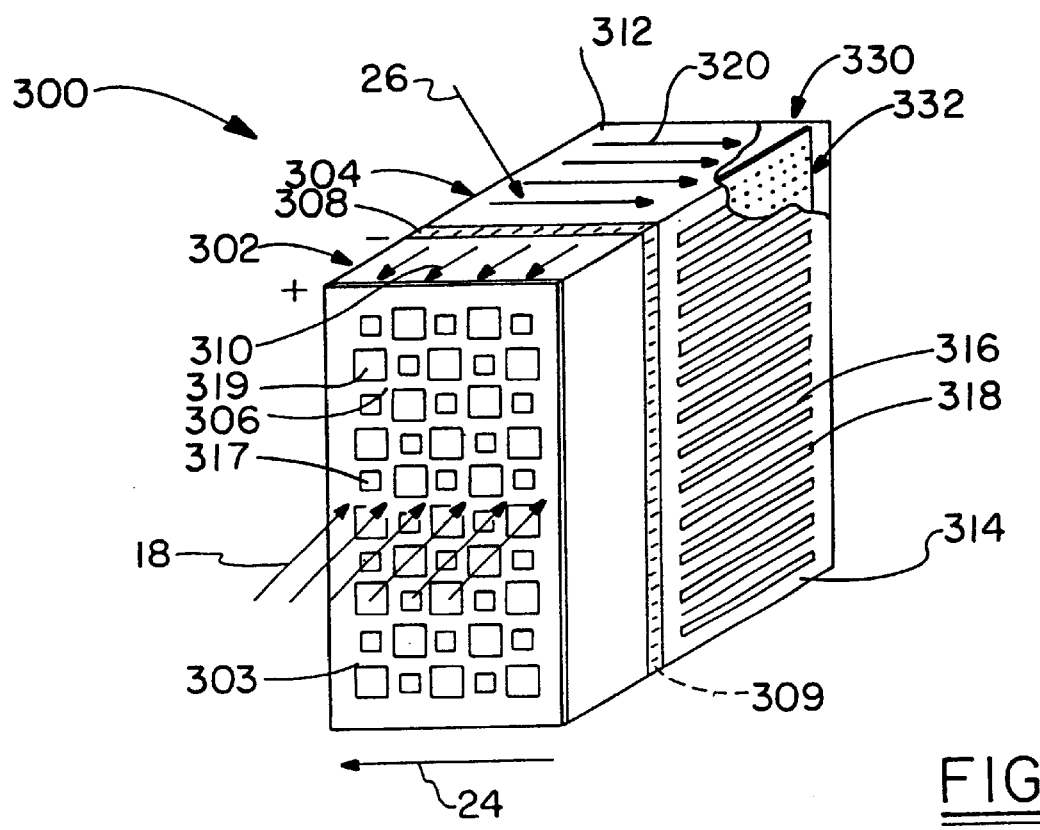
FIG. 7 is a partially cutaway schematic diagram of an alternative embodiment employed in imaging.

To further improve the signal to noise ratio, the microstrip anodes 316 and cathodes 318 may be operated as an amplifier, applying a potential as above, or as a Frisch Grid. To operate them as a Frisch Grid, the collector electrode is made much smaller than the noncollecting grid, and one of the strips is maintained at a potential slightly positive with respect to that of the second electrode. FIG. 5 shows a strip collector with Frisch Grid capabilities. As shown, the low energy detector anode 316 is much smaller than the noncollecting cathode strip. The noncollecting cathode strip serves to shield the collector. Large induced charge results on the strip collector anode 316. It should be understood that any geometry of anode and cathode can be utilized, as long as, the anode is smaller than the cathode. This size difference minimizes the induced signal. For example, FIG. 7 shows an alternative embodiment having a series of smaller anodes 317 and larger cathodes 319 placed on the substrate 303 utilizing a square geometry. As in the case of the strip anodes 316 and cathodes 318, the larger cathodes 319 reduce the induced charge signal. To assure optimum surface resistivity, appropriate surface techniques, such as under coating or over coating are applied to the strips. Operating the anode and cathode as a Frisch Grid allows detection of the signal resulting from charge motion, and not from induced charge. Accordingly, the line spread function is significantly narrowed, and enhanced image quality is obtained. The images generated by the high energy detector 302 and the detector 304 are then transferred to their corresponding circuits 44 and 70, FIG. 1, for processing by the processor 40 which in turn generates a contrasted image signal 74. As in the previous embodiment, the electrical leads in components associated with the detectors 304 and 302 are connected to the respective detection circuits which are in turn connected to the processor 40.

Figure 6:
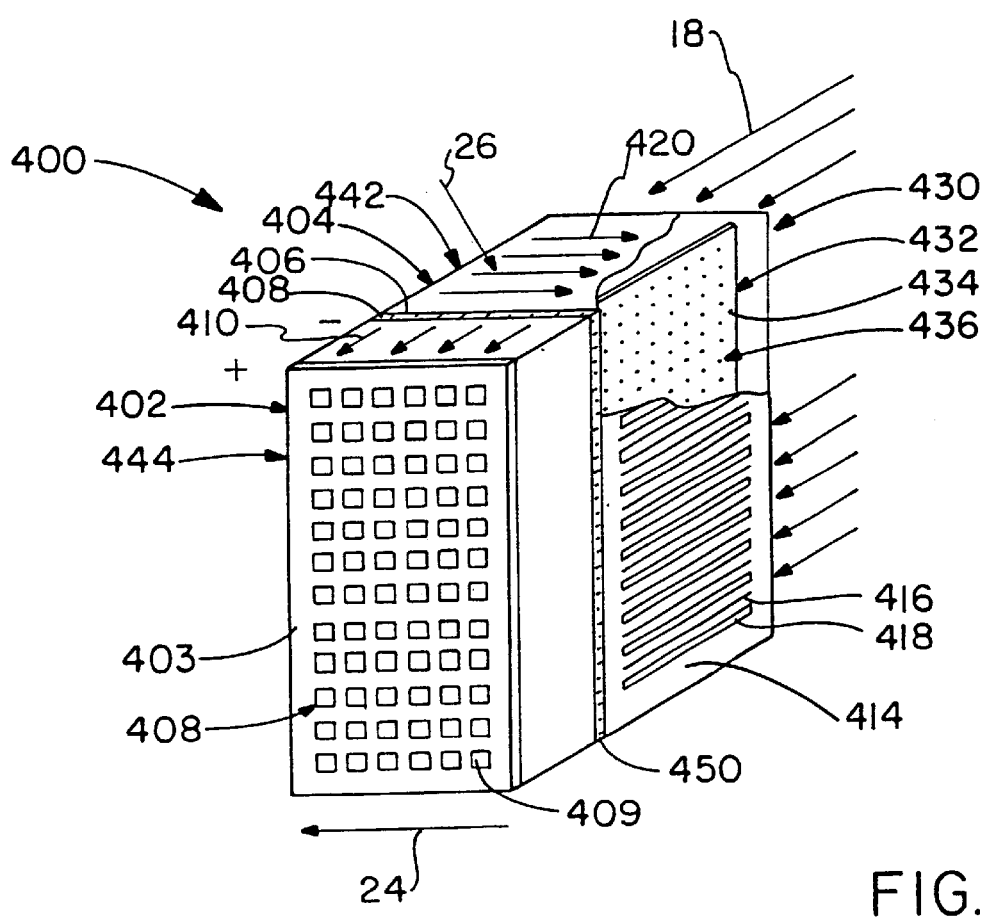
FIG. 6 is a partially cutaway schematic diagram of an alternative embodiment employed in imaging.

In yet another embodiment, as shown in FIG. 6, an alternative multi-detector is generally designated by the numeral 400. The multi-detector 400, as described above is provided with a first detector 402, and a second detector 404. In this embodiment, the GEM 430 is placed within the detector volume. The primary electrons produced by the x-ray ionization of the gas drift toward the GEM 430, as above. Electron multiplication occurs at the GEM 430. As this is occurring, the produced ions drift toward the cathode 416. The cathode 416 is used as a Frisch Grid. As described above, the collector electrode is much smaller of that of the non-collecting grid, and one of the strips is maintained at a potential slightly positive with respect to that of the second electrode. By maintaining one of the strips at a slightly positive potential, amplification occurs. To assure optimum surface resistivity, appropriate surface treatment techniques, under coating or over coating, are employed.

Preferably, fabrication for the micro-strip detector utilizes photolithographic techniques to replace anode-cathode wires with ultra fine layers of conductive strips. Using these techniques improves accuracy in the anode-cathode pattern and ensures high gain uniformity over large areas within the micro-strip detector. Using these techniques, the conductive strips are arranged in an anode-cathode pattern on an insulating or partially insulating glass substrate.

The primary electrons produced by direct x-ray ionization of the gas drift towards the micro-strip plate. When these electrons reach the micro-strip substrate the electrons drift towards the positively charged strip and experience an avalanche amplification. The quasi-dipole anode-cathode configuration causes high field strength that motivates amplification. Ions are collected rapidly on the adjacent cathode giving rise to the detected image signal. The generated image is then transferred to the corresponding circuits 44 and 70, FIG. 1, for processing by the processor 40 which in turn generates a contrasted image signal 74. As in the previous embodiment, the electrical leads in the components associated with the detectors 404 and 402 are connected to the respective detection circuits which are in turn connected to the processor 40.

From the foregoing discussion, it will be appreciated that the system 10 with the multi-detectors 20, 100, 140, 300, and 400 combine the high energy absorption efficiency of the solid ionization detectors, with the high spatial resolution resulting from the fine microstrip collector size and its high gain provided by the low energy detectors. As a result, good spatial and contrast resolution, at a low radiation dose, is provided. Additionally, the system 10 allows freedom to design and optimize a dual-energy system. All of the detectors disclosed herein may operate in a scanning slot beam or pixelated geometry. These detectors may also operate as large area detectors. Using these geometries is more economical than open beam geometry because the detector does not have to be large enough to cover the entire object to be imaged. Kinestatic principles are utilized in generating the imaging signals by the low energy detectors, while the high energy detector employ time-delay integration techniques to generate the corresponding observation signals for the scanning slot beam geometries.

Thus, it can be seen that the objects of the invention have been attained by the structure and methods presented above. While in accordance with the patent statutes, only the best mode and preferred embodiment of the invention has been described in detail, the invention is not limited thereto or thereby. Accordingly, for an appreciation of the true scope and breadth of the invention, reference should be made to the following claims.

What is claimed is:

1. A multi-detector which receives incident ionizing radiation through a subject, comprising:
   a gas ionization detector;
   a semiconductor ionization detector positioned adjacent said gas ionization detector; and
   a gas electron multiplier positioned within said gas ionization detector, wherein electric fields are applied to each said detector to generate corresponding signals, and wherein said gas electron multiplier increases electron activity to enhance the performance of said gas ionization detector.

2. The multi-detector of claim 1, wherein said gas electron multiplier is an insulating foil with metal clad on both sides and perforated by a regular matrix of holes.

3. The multi-detector according to claim 2, further comprising:
   a sealed enclosure for receiving said detectors; and
   a control system connected to each said detector, wherein said control system controls application of said electric fields and monitors said signals.

4. The multi-detector according to claim 3, a gas ionization detection circuit connected to said gas ionization detector for controlling application of the electric field thereto and generating a gas ionization detector signal;
   semiconductor ionization detection circuit connected to said semiconductor ionization detector for controlling application of the electric field thereto and generating a semiconductor ionization detector signal; and
   a processor for receiving said detector signals and generating said contrasted signal which is received by a display.

5. The multi-detector according to claim 4, wherein said gas ionization detector comprises
   a high voltage plate; and
   a substrate carrying a plurality of interleaved anodes and cathodes, said substrate positioned opposite said high voltage plate with said gas electron multiplier positioned between said substrate and said high voltage plate, wherein said high voltage plate generates electrons that collide with gas particles inside said matrix of holes to accelerate said electrons to strengthen said gas ionization detector signal.

6. The method according to claim 5, wherein the anodes are larger than said cathodes.

7. The multi-detector according to claim 5, wherein said cathodes are larger than said anodes.

8. A method for obtaining an image of a subject exposed to incident radiation comprising the steps of:
   exposing a multi-detector to incident radiation projected through a sample, wherein said multi-detector comprises a first detector adjacent a second detector;
   generating a low energy signal from said first detector;
   generating a high energy signal from said second detector;
   placing a gas electron multiplier near at least one of said detectors; and
   comparing said first and second signals.

9. The method according to claim 8, wherein said gas electron multiplier is placed within a few millimeters of at least one of said detectors.

10. The method according to claim 8, further comprising the steps of:
    enclosing said multi-detector in a gas-filled enclosure;
    applying respective electric fields to said first detector and said second detector, wherein the gas is ionized by the incident radiation within one of said first and second detectors and the other of said first and second detectors is a semiconductor material that is ionized by the incident radiation for generating said first and second signals.

11. A method according to claim 10, wherein said gas electron multiplier is placed within said gas filled enclosure.

12. The method according to claim 11, wherein said gas electron multiplier is an insulating foil, metal clad on both sides, and perforated by a plurality of holes.

13. The method according to claim 12, wherein said electric fields are applied such that electrons drift towards said gas electron multiplier; positively charging said gas electron multiplier to amplify the electron flow, such that an increased electron flow strikes at least on of said detectors generating a stronger signal.

14. The method according to 11, further comprising the step of:
    applying respective electric fields to create an electron flow; and
    placing said gas electron multiplier in front of said electron flow, such that, said gas electron multiplier filters scattered electron motion.

15. The method according to claim 10, further comprising the step of:

operating at least one of said detectors as a Frisch Grid.

16. The method according to claim 10, further comprising the step of:

scanning said multi-detector in a plane orthogonal the incident radiation;

wherein the electric field applied to one of said first and second detectors is adjusted so that the ion speed is substantially equal and opposite to the scanning speed of said multi-detector.

17. The method according to claim 10, further comprising the step of:

scanning said multi-detector in a plane orthogonal the incident radiation;

wherein the electric field applied to one of said detectors generates a collective charge on a surface of said semiconductor material arrayed in rows and columns, wherein the speed with which the collective charge is transferred along one of said rows and said columns is synchronized with the scanning speed of said detector.

18. The method according to claim 10, further comprising the steps of:

orienting said gas ionized detector to receive the incident radiation first; and orienting the electric fields generated by said gas ionized detector and said semiconductor ionized detector in a plane orthogonal to the incident radiation.

19. The method according to claim 10, further comprising the steps of:

orienting said semiconductor ionized detector to receive the incident radiation first;

orienting the electric field generated by said semiconductor ionized detector in a direction opposite the incident radiation; and orienting the electric field generated by said gas ionized detector in a plane orthogonal to the incident radiation.

20. The method according to claim 10, further comprising the steps of:

orienting said gas ionized detector to receive the incident radiation first;

orienting the electric field generated by said gas ionized detector in a plane orthogonal to the incident radiation; and orienting the electric field generated by said semiconductor ionized detector in a direction aligned with the incident radiation.

21. The method according to claim 10, further comprising the steps of:

orienting said semiconductor ionized detector to receive the incident radiation first;

orienting the electric fields generated by said gas ionized and semiconductor ionized detectors in the same direction as the incident radiation.

22. The method according to claim 10, further comprising the steps of:

orienting said gas ionized detector to receive the incident radiation first;

orienting the electric fields generated by said gas ionized and semiconductor ionized detectors in the same direction as the incident radiation.

23. The method according to claim 12, further comprising the steps of:

selectively utilizing said first and second signals for imaging, radiation monitoring and radiation measuring.

* * * * *